United States Patent [19]

Casiraghi et al.

[11] Patent Number: 4,991,164
[45] Date of Patent: Feb. 5, 1991

[54] AUTOMATIC TRANSMIT POWER LEVEL CONTROL IN RADIO LINKS

[75] Inventors: Umberto Casiraghi, Biassono; Luigi Vismara, Vimercate, both of Italy

[73] Assignee: Telettra-Telefonia Elettronica e Radio s.p.a., Italy

[21] Appl. No.: 262,617

[22] Filed: Mar. 23, 1989

[51] Int. Cl.[5] ............................ H04J 1/6; H04J 3/14
[52] U.S. Cl. ........................................ 370/17; 370/13; 455/24; 455/52; 455/63; 455/69; 375/60; 375/58; 375/98
[58] Field of Search ................... 370/13, 13.1, 77, 17, 370/18, 19, 20, 32, 74, 97, 98, 110.1; 455/17, 24, 50, 52, 57, 63, 69, 58, 78; 178/1.4 C; 371/5, 34, 5.1; 375/58, 60, 76, 98

[56] References Cited

U.S. PATENT DOCUMENTS

| | | | |
|---|---|---|---|
| 4,309,771 | 1/1982 | Wilkens | 455/69 |
| 4,731,866 | 3/1988 | Muratani et al. | 455/69 |
| 4,752,967 | 6/1988 | Bustamante et al. | 455/69 |
| 4,777,653 | 10/1988 | Bonnerot et al. | 455/69 |

Primary Examiner—Douglas W. Olms
Assistant Examiner—Wellington Chin
Attorney, Agent, or Firm—Ostrolenk, Faber, Gerb & Soffen

[57] ABSTRACT

A system for stabilization of the coupling value between the transmitted radio signals resulting from cross polar discrimination, using the transmit power level control in radio link systems formed of several radio channels using multilevel QAM modulation. A first control signal is derived for each RF channel and a second control signal is derived for the adjacent channels. The first and second control signal are then combined to derive threshold signals. The threshold signals are multiplexed with station identification signals and this multiplexed signal is multiplexed with other service signals. The twice multiplexed signal is then inserted in the frame of a main information signal. The signal is demultiplexed to derive a remote transmit power control signal. The atmospheric precipitation condition is evaluated through statistical control of the bit error rate. A local transmit power control signal is derived. The local and remote transmit power control signals are then applied the predistortion circuits of the power amplifiers.

5 Claims, 1 Drawing Sheet

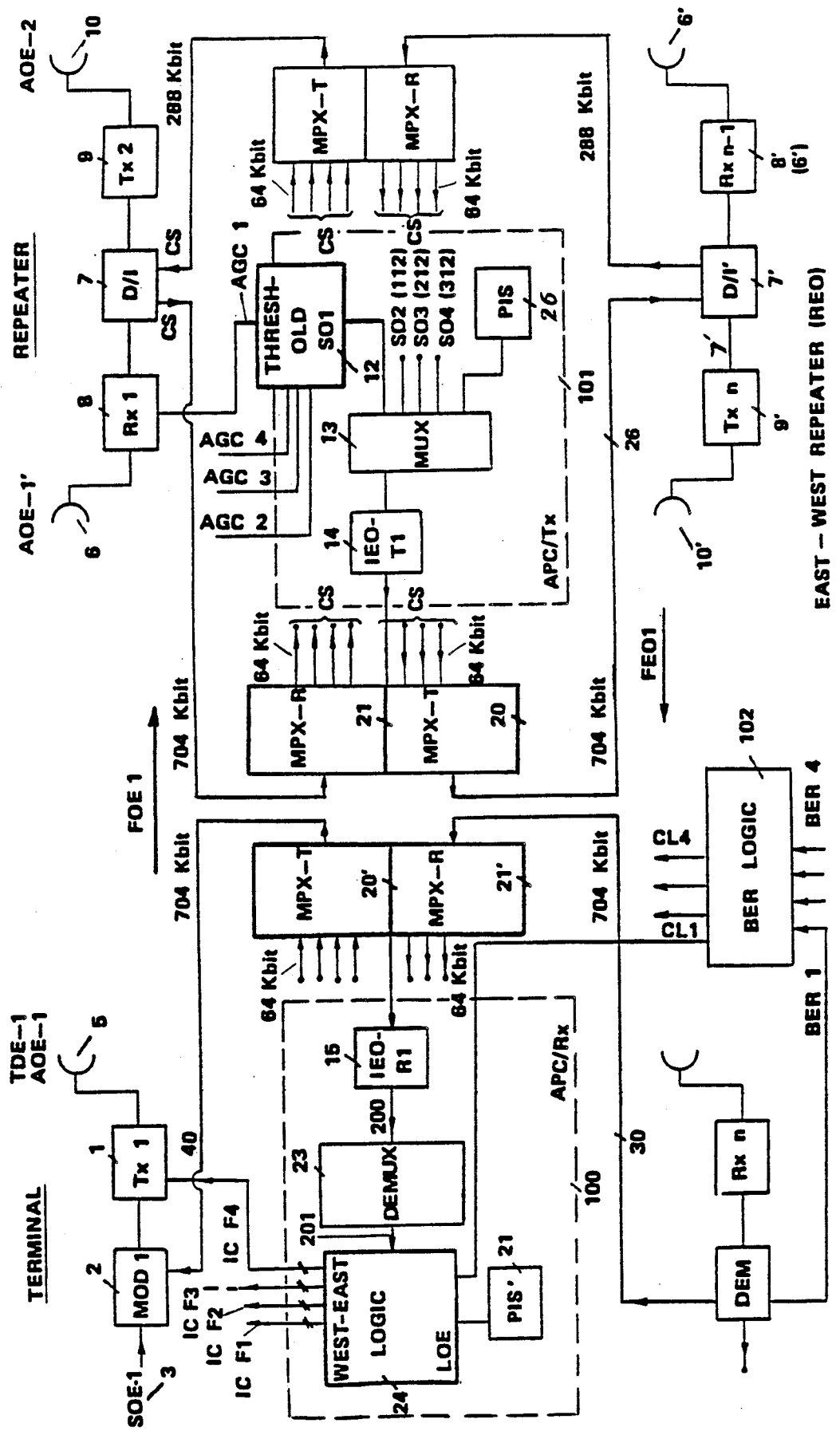

AUTOMATIC TRANSMIT POWER LEVEL CONTROL IN RADIO LINKS

DESCRIPTION OF THE INVENTION

The present invention refers to an automatic power control (APC) system in signal transmissions between transmitting and receiving stations via radio link, and specifically radio links using digital modulation techniques, as described, for example, in a previous application of the same applicant. Now, the present invention refers to a system to control and achieve a stability as high as possible of cross polar discrimination, in order to allow for the transmission of two digitally modulated signals, for example multilevel QAM modulated signals, at the same carrier frequency, in systems formed of, for example, up to 11+1 RF channels, with frequency reuse.

The present invention also includes the circuits for the inplementation of the subject system.

The automatic power control in radio transmission is described in the literature. Specifically, U.S. Pat. No. 4,004,224 describes a method whereby the operation of all transmitters in a link takes place, during no-fading periods, with a power level lower than that normally used in the periods during which there is fading. In the system according to the present invention, the power variation is now advantageously calculated with the purpose of providing a sufficient operating margin in the power control with respect to possible degradations of XPD (cross polar discrimination).

The system object of the present invention is effective when using RF frequency plans with frequency reuse, taking advantage of cross polar discrimination.

In high capacity digital systems, the system according to the present invention protects the radio channel from cross-polar interference at the same frequency, and from co-polar interference from the adjacent RF channels.

The same system is also effective in special cases of very heavy atmospheric precipitations resulting in a major reduction of the mean value of cross polar discrimination.

In this case advantage is taken of a quality control made in the RF channels through the measurement of bit error rate (BER) in reception, then a statistical coefficient is applied to this control and it is used to locally control the power levels of all transmitters used to double the exploitation of the RF frequency band assigned. This local control is operating only in the case of very heavy precipitations that may occur at particular latitudes, for example in tropical countries and next to coastal zones.

Whenever the local control is activated, the number of radio channels is halved for each direction of transmission.

Each transmitter-associated remote receiver set requires a power control device, comprised of a circuit that detects the power level received by the main receiver and the receivers that affect the stabilization of the interference levels.

The said receivers are basically: the cross-polar channel and the two co-polar channels operating on the two adjacent frequencies.

A comparator compares the signals corresponding with the levels of the four receivers and generates a reference signal for controlling the remote transmitter; a modulator inserts this control signal in the high frequency transmission system used to carry the information signals. Obvioulsy, the said APC device also includes a demodulator that demodulates the control signal which drives a power amplifier gain regulator circuit.

The purpose of the present invention is to provide an automatic power control (APC) particularly effective with respect to cross polar discrimination and adjacent channel interferences in radio transmissions using multilevel QAM modulation.

A further objective of the invention is to provide an APC for radio link systems comprised of several RF channels (multiline systems), using digital service channel equipment, preferably multiplexes and digital drop-/insert devices, for transmitting the control signals necessary to control the said RF channels, see the already mentioned patent application of the same applicant.

These and other objectives are achieved using a control in accordance with the present invention, comprised of:

means to derive a first control signal for each RF channel in each receiver, and a second control signal for the adjacent channels, means to combine tha said 1st and 2nd control signals to derive threshold signals, means to multiplex all of the threshold signals of the individual receivers, means to insert a station identification signal in the said multiplexer, means to further multiplex the the said multiplexed signal with other service signals, means to insert this dual multiplexed signal in the frame of the main information signal transmitted in the other direction of transmission, means to receive and demultiplex the received signal two times, means to process this demultiplexed signal so as to derive, on one hand, a transmit power remote control signal, called signal Nr. 1, protected from possible faults or malfunctions in the main digital channel and, on the other hand, the station identification signal, means to evaluate exceptional atmospheric precipitation conditions (rain, snow, hail, etc.) through a statistical control of the bit error rate made on the receivers installed in the same station as the transmitters, the transmit power of which is controlled, means to simultaneously derive a transmit power local control signal, called signal Nr. 2, in the same station where are installed the receivers, the bit error rate information of which is processed, means to apply the said control signals to the pre-distortion circuits that are part of the power amplifiers of the transmitters.

Other characteristics of the present invention are specified in the sub-claims.

The various features and advantages of the present invention will be better understood through the preferred (but not limiting) embodiments illustrated in the attached block diagram (FIG. 1), in a similar way as described in the previous patent application of the same applicant.

FIG. 1 is a functional block diagram of the system in accordance with the present invention, applied, as an example, to the transmission-reception of four RF channels in the west to east direction, and four radio channels in the east to west direction, with reuse of the RF frequencies in a cross-polarized configuration.

For sake of simplicity, FIG. 1 shows only one terminal (TOE.1), and specifically that from est to east, comprised of a modulator (MOD.1) which modulates the information signal to transmit SOE.1 (3); the true transmitter TX1 (1), and the respective antenna A.O.E.1 (5). The repeater receiver (6) conventionally includes the correspondig receiver RX1 (8) connected with antenna A.O.E.1' followed by the service channel (CS) drop/insert (D/I) circuit (7), and transmitter TX2 (9) connected with antenna A.O.E.2 (10) that is part of the subsequent radio hop.

According to a feature of the present invention, a threshold circuit $SO_1$ (12) is associated with each of receivers RX1 (8) (the remaining ones RX2, RX3 and RX4 and the corresponding cross-polar co-channels RX1, RX2, RX3 and RX4 are not intentionally indicated). This threshold circuit $SO_1$ uses the following signals: AGC1, received field strength indicator signal coming from its own receiver; AGC2, AGC3 received field strength indicator signals coming from the co-polar adjacent receivers; AGC4, received field strength indicator signal coming from the co-channel receiver operating on the same frequency. The threshold circuit processes the mentioned signals and outputs a digital signal to an information multiplexer MUX (13) that also receives the remaining threshold signals $SO_2$ (112), $SO_3$ (212) and $SO_4$ (312) and generates a frame, for example at a bit rate of 64 Kbit/s, carrying the information from the threshold circuits to be sent back in the west direction, through an appropriate east-west interface circuit IEO-T1 (14), for example of the standard G.703 contradirectional type.

According to the invention, the signal output from interface IEO-T1 (14) (at a bit rate of 64 Kbit/s) is subsequently fed to transmit section MPX-T (20) of a service multiplexer, wherein it is multiplexed together with other (for example, three) similar signal at 64 Kbit/s; the service multiplexers outputs, on line 25, a signal at, for example, 704 Kbit/s that is fed to drop/insert equipment D/I' (7'') of the east-west repeater, R.E.O. (6'), that feeds signal 7' to transmitter TXn (9') that feeds it to antenna 10'. The signal radiated by the antenna reaches receiver RXn, where it is demodulated in the DEM block, and is fed, through line 30, to demultiplexer MPX-R (receive side) (21'). MPX-R outputs the various signals at 64 Kbit/s, one of which is fed to interface I.E.O.-R1 (15), the output signal of which (200) is demultiplexed and paralleled in DEMUX (23). The output signal 201 is, according to the invention, processed in the O-E logic (O.E.-24) that performs a number of critical functions:

(1) extracts the station identification word PIS inserted in 26 and compares it to a word PIS' generated locally in 27;

(2) extracts the information necessary to control the transmit powers of the individual RF channels ICF1, ICF2, ICF3, ICF4 (in the case considered in the figure, that shows only four channels). The control signal, for example ICF1, is typically applied to transmitter TX1 (1) through line 40, as described in the previous patent application of the same applicant.

(3) performs filtering and alarm management functions on the received signals, so as to protect the APC system from faults and malfunctions of the digital channel used to transmit the APC information;

(4) manages the local and remote manual control operations;

(5) Logic OE (OE-24) also receives a CL1 signal coming from the BER logic (102) relevant to the local transmit power control in the case of very heavy atmospheric precipitations.

BER logic (102) receives the alarm signals from all receivers (DEM) installed in the west stations, which use the same cross-polar frequencies (as, for example, for the case of an expansion of the pre-existing transmission capacity), statistically processes these signals and derives the simultaneous control signals (CL1-CL4) that are sent to the respective APC/RX logics for the above mentioned local transmit power control.

Among the most significant features and advantages of the invention, we mention the following ones:

(1) The power control is implemented inside a predistortion circuit associated with the transmitter, so as to activate it during the percentages of time when power is varied and to disactivate it when the system operates at the nominal power level; this solution is such that the microwave power amplifiers oPerate under high linearity conditions for almost all the time, which is a requirement for the aforementioned multilevel QAM systems, without loosing the corrective effect of the pre-distortion circuit during the small period of time during which the power level is the maximum one.

(2) The control of the transmit power takes place continuously. The value of the nominal power (i.e. the attanuation with respect to the max. transmitter power) and the APC circuit operating threshold are fixed. The operating threshold gradually increases or decreases the transmit power, within the operating range of the driver, according the information resulting from the analysis made on the receivers for cross polar descrimination.

(3) The proposed APC system is applicable to high capacity digital radio links using multilevel QAM modulation systems and its embodiment according to the invention is very well suitable for expanding the system configurations up to $2\times(11+1)$ RF channels with frequency reuse in cross-polar configuration.

(4) A station identification system has been introduced to prevent the risk of receiving an APC control signal coming from a different station in the case of the operation of a protection circuit, for example because of a drop/insert circuit by-passed in a repeater station.

(5) The system takes full advantage of control message convalidation techniques, whereby the transmit power level is frozen at the nominal level in the case of faults or malfunctions in the channel used to transmit the information.

(6) The system includes a manual maintenance control providing facilities for local and remote controlled operations.

(7) The system characteristics of the proposed solution and their implementing modes make it possible an easy expansion of the power control to system configurations comprised of several RF channels, up to max. $2\times(11+1)$.

(8) It is also highligthed that the automatic transmit power level control in accordance with the present invention does not affect at all the pre-existing local transmit power control, which counteracts variations in the environmental operating conditions and components aging. The present invention has been described, with reference to preferred embodiment, in order to make the explanation easier to understand; however it is susceptible of variations, modifications and replacements that, being accessible to technicians having an average skill in the sector, naturally fall in the wider spirit of the present invention.

We claim:

1. A transmit power control system for multiline radio links using microwave signal digital modulation, specifically multilevel QAM modulation, in each RF transmitter receives, from a respective receiver associated therewith and interfering receivers, signals indicating the levels of the useful signals received on that RF channel and sends said signals back to the associated transmitter in order to regulate the transmit power level, comprising:
   - means for deriving a first control signal for each RF channel in each receiver, and a second control signal for adjacent channels;
   - means for combining said first and second control signals to derive threshold signals;
   - means for multiplexing all the threshold signals of each of the receivers;
   - means for inserting a station identification signal in said multiplexer;
   - means for further multiplexing said multiplexed signal with other service signals;
   - means for inserting the twice multiplexed signal in the frame of the main information signal transmitted in the other direction of transmission;
   - means for receiving and twice demultiplexing the received signal;
   - means for processing the demultiplexed signal to derive a transmit power remote control signal protected from possible faults or malfunctions in the main digital channel and the station identification signal;
   - means for evaluating exceptional atmospheric precipitation conditions by statistical control of the bit error rate made on the receivers installed in the same station as the transmitters, the transmit power of which is controlled;
   - means for simultaneously deriving a transmit power local control signal in the same station having the receivers, the bit error rate information of which is processed; and
   - means for applying said control signals to the predistortion circuits of the power amplifiers of the transmitters.

2. A system as claimed in claim 1, further comprising means for performing said power control manually.

3. A system as claimed in claim 1, wherein the predistortion circuit has a corrective effect on the distortion of the RF transmit amplifier only during the periods of time when the transmit power level is maximum.

4. A system as claimed in claim 1, wherein the predistortion circuit keeps the automatic transmit power control circuit operating by freezing the transmit power level.

5. A system as claimed in claim 3, wherein the predistortion circuit keeps the automatic transmit power control circuit operating by freezing the transmit power level.

* * * * *